(12) United States Patent
Kim et al.

(10) Patent No.: US 12,167,155 B2
(45) Date of Patent: Dec. 10, 2024

(54) IMAGE SENSOR, CAMERA MODULE, AND OPTICAL DEVICE COMPRISING CAMERA MODULE

(71) Applicant: LG INNOTEK CO., LTD., Seoul (KR)

(72) Inventors: Dae Hun Kim, Seoul (KR); Jung Ah Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 134 days.

(21) Appl. No.: 17/631,551

(22) PCT Filed: Aug. 5, 2020

(86) PCT No.: PCT/KR2020/010361
§ 371 (c)(1),
(2) Date: Jan. 31, 2022

(87) PCT Pub. No.: WO2021/029599
PCT Pub. Date: Feb. 18, 2021

(65) Prior Publication Data
US 2022/0224852 A1     Jul. 14, 2022

(30) Foreign Application Priority Data
Aug. 9, 2019  (KR) .......... 10-2019-0097830

(51) Int. Cl.
*H04N 25/76* (2023.01)
*H04N 23/54* (2023.01)
(Continued)

(52) U.S. Cl.
CPC .......... *H04N 25/76* (2023.01); *H04N 23/54* (2023.01); *H04N 25/443* (2023.01); *H04N 25/48* (2023.01)

(58) Field of Classification Search
CPC ...... H04N 25/76; H04N 23/54; H04N 25/443; H04N 25/48; H04N 23/69; H04N 23/80;
(Continued)

(56) References Cited

U.S. PATENT DOCUMENTS

| 7,149,262 B1 | 12/2006 | Nayar et al. |
| 2016/0093023 A1* | 3/2016 | Prasad ............ G06T 3/4053 382/173 |

(Continued)

FOREIGN PATENT DOCUMENTS

| CN | 106576143 A | 4/2017 |
| CN | 109889800 A | 6/2019 |

(Continued)

OTHER PUBLICATIONS

Zhang et al., "Deep Joint Demosaicing and Super Resolution on High Resolution Bayer Sensor Data", 2018 IEEE Global Conference on Signal and Information Processing (GlobalSIP), IEEE, Nov. 26, 2018, pp. 619-623.

*Primary Examiner* — Sinh Tran
*Assistant Examiner* — Zhenzhen Wu
(74) *Attorney, Agent, or Firm* — Birch, Stewart, Kolasch & Birch, LLP (57) ABSTRACT

An image sensor according to one embodiment may comprise: an image sensing unit which receives light and generates a first Bayer pattern having a first resolution; and a processor which receives a second Bayer pattern that is at least a portion of the first Bayer pattern from the image sensing unit, and then generates a third Bayer pattern having a higher resolution than the second alignment unit on the basis of the received second Bayer pattern.

7 Claims, 6 Drawing Sheets

(51) Int. Cl.
  *H04N 25/443* (2023.01)
  *H04N 25/48* (2023.01)
(58) Field of Classification Search
  CPC ...... H04N 23/815; H04N 23/84; H04N 23/50;
       H04N 23/55; H04N 25/70; H04N 23/67;
       H04N 23/843; G06N 3/006; G06N 3/045;
       G06N 3/08; G06T 3/4015; G06T 3/4046;
                                        G06T 3/4053
  See application file for complete search history.

(56) References Cited

U.S. PATENT DOCUMENTS

| | | | |
|---|---|---|---|
| 2018/0322614 A1 | 11/2018 | Petrova et al. | |
| 2019/0108618 A1 | 4/2019 | Hwang et al. | |
| 2019/0139205 A1* | 5/2019 | El-Khamy | G06V 30/2504 |
| 2019/0141299 A1 | 5/2019 | Siddiqui et al. | |
| 2020/0077026 A1* | 3/2020 | Jeong | H04N 1/2112 |
| 2020/0252555 A1 | 8/2020 | Choi et al. | |
| 2020/0334789 A1* | 10/2020 | Zhang | H04N 23/69 |
| 2021/0224953 A1* | 7/2021 | El-Khamy | G06N 3/045 |
| 2021/0235045 A1* | 7/2021 | Shukla | H04N 25/447 |
| 2022/0123033 A1* | 4/2022 | Park | H01L 27/14605 |

FOREIGN PATENT DOCUMENTS

| | | |
|---|---|---|
| EP | 2 180 714 A2 | 4/2010 |
| EP | 2 753 082 A1 | 7/2014 |
| JP | 2006-191622 A | 7/2006 |
| JP | 2013-66146 A | 4/2013 |
| JP | 2018-151747 A | 9/2018 |
| KR | 10-2003-0020357 A | 3/2003 |
| KR | 10-2014-0112371 A | 9/2014 |
| KR | 10-1791573 B1 | 10/2017 |
| KR | 10-2018-0122548 A | 11/2018 |
| KR | 10-2019-0021756 A | 3/2019 |
| KR | 10-2019-0029083 A | 3/2019 |
| KR | 10-2019-0037842 A | 4/2019 |

\* cited by examiner

IMAGE SENSOR, CAMERA MODULE, AND OPTICAL DEVICE COMPRISING CAMERA MODULE

CROSS REFERENCE TO RELATED APPLICATIONS

This application is the National Phase of PCT International Application No. PCT/KR2020/010361, filed on Aug. 5, 2020, which claims priority under 35 U.S.C. 119 (a) to Patent Application No. 10-2019-0097830, filed in the Republic of Korea on Aug. 9, 2019, all of which are hereby expressly incorporated by reference into the present application.

TECHNICAL FIELD

The present invention relates to an image sensor, a camera module, and an optical device including a camera module, and more particularly, relates to a technology for performing line image processing using a separate processor included in the image sensor.

BACKGROUND ART

As technology advances and miniaturization of camera devices becomes possible, small camera devices are being applied to and used in various IT devices such as smartphones, mobile phones, PDAs, and the like. The camera devices are manufactured using an image sensor such as CCD or CMOS as a main component, and is manufactured to enable focus adjustment in order to adjust the size of an image.

Such a camera device is configured to include a plurality of lenses and an actuator, and an object with respect to the subject can be photographed in a manner in which an optical focal length is adjusted when the actuator moves each lens to change the relative distance.

Specifically, the camera device includes an image sensor that converts an optical signal received from the outside into an electrical signal, a lens that focuses light onto the image sensor, an infrared (IR) filter, a housing including them, and a printed circuit board that processes the image sensor signal, and the like, and the actuator adjusts the focal length of the lens by an actuator such as a voice coil motor (VCM) actuator or a micro electromechanical systems (MEMS) actuator.

Meanwhile, as technology advances and enables the realization of high resolution images, the demand for technologies capable of realizing high resolution images of distant objects is also increasing.

In general, cameras are equipped with a zoom function to take pictures of distant objects, and the zoom function is largely divided into an optical zoom in which the actual lens inside the camera moves to magnify the subject and a digital zoom method in which zoom effect is achieved by enlarging a portion of an image data of the photographed subject using a digital processing method.

In the case of optical zoom, which obtains an image of a subject by using lens movement, an image having a relatively high resolution can be obtained, but there is a problem in that the internal structure of the camera is complicated and the cost increases due to the addition of parts. In addition, there is a limit to an area in which a subject can be enlarged by using an optical zoom, and for this part, a technology for correcting with software is being developed.

In addition to these methods, technologies exist to implement high resolution images by generating more pixel information by moving parts inside the camera, such as a sensor shift technology that shakes the sensor with voice coil motor (VCM) or micro-electro mechanical systems (MEMS) technology, an optical image stabilizer (OIS) technology that obtains pixel information by shaking the lens with VCM and the like, and a technology that shakes the filter between the sensor and the lens, and the like.

However, the disadvantage of these technologies is that, when photographing a moving object, phenomena such as motion blur or artifacts may occur because they synthesize data of several parallaxes, which causes the problem of lowering the image quality.

On the other hand, as a high resolution implementation technology using a software algorithm generally used in TVs, there exist a single-frame super resolution (SR) or a multi-frame super resolution (SR) technology or the like.

In the case of these technologies, there is no artifact problem, but it is an algorithm that is difficult to apply to devices to which small camera modules such as mobile, vehicle, IoT, and the like can be applied, and in addition, a separate image processor is mounted in order to implement such a technology.

However, since the software for performing such a synthesis algorithm generally has a large amount of data to be processed, there was a problem that it was difficult to process in real time even in an application processor (AP), and even if the AP could perform these functions, such an AP was expensive, and there was a problem in that the manufacturing cost is increased.

DETAILED DESCRIPTION OF THE INVENTION

Technical Subject

Accordingly, the present invention is an invention devised to solve the problems of the prior art as described above, and to provide a camera module and an optical device including the same capable of performing the same function without mounting an expensive AP by performing pre-processing of at least a part of image processing processed by the AP using a separate processor mounted on the image sensor.

In addition, it is to provide a camera module and an optical device including the same capable of reducing the burden on the AP by performing pre-processing on the image to be outputted to the outside based on the information on the Bayer pattern received from the image sensor before image processing in the AP.

Technical Solution

The image sensor according to an embodiment may comprise: an image sensing unit that receives light and generates a first Bayer pattern having a first resolution; and a processor for receiving a second Bayer pattern that is at least a part of the first Bayer pattern from the image sensing unit to generate a third Bayer pattern having a higher resolution than the second Bayer pattern based on the received second Bayer pattern.

The image sensor may comprise an alignment unit for receiving the first Bayer pattern from the image sensing unit to generate the second Bayer pattern by decomposing or re-arranging at least a portion of the first Bayer pattern.

The processor may generate the third Bayer pattern based on the second Bayer pattern received from the alignment unit.

The processor may output the second Bayer pattern by performing super resolution (SR) or zooming on the first Bayer pattern.

The processor may output the third Bayer pattern by performing image processing on the second Bayer pattern based on an algorithm obtained by performing deep learning.

A camera module according to another embodiment may comprise: an image sensing unit for receiving a light to generate a first Bayer pattern having a first resolution; and a processor for receiving a second Bayer pattern that is at least a part of the first Bayer pattern from the image sensing unit to generate a third Bayer pattern having a higher resolution than the second Bayer pattern based on the received second Bayer pattern.

The camera module may comprise an alignment unit for receiving the first Bayer pattern from the image sensing unit to generate the second Bayer pattern by decomposing or re-arranging at least a portion of the first Bayer pattern.

The processor may generate the third Bayer pattern based on the second Bayer pattern received from the alignment unit.

The processor may output the third Bayer pattern by performing image processing on the second Bayer pattern based on an algorithm obtained by performing deep learning.

An optical device according to another embodiment comprises: an image sensing unit for receiving a light to generate a first Bayer pattern having a first resolution; an application processor (AP) for receiving image information being outputted from the image sensor; and a processor for generating a third Bayer pattern having a higher resolution than the second Bayer pattern based on a second Bayer pattern that is at least a part of the first Bayer pattern, wherein the image information may include information corresponding to the third Bayer pattern.

The processor receives image information from the AP, and then sets a range to be set to the second Bayer pattern from the first Bayer pattern based on the image information that has been received, and may generate the third Bayer pattern based on the range that has been set.

The processor may output the third Bayer pattern to the AP.

The image information may include zoom information on the first Bayer pattern and the processor may set a range to be set to the second Bayer pattern based on the zoom information.

The optical device may further include a display that displays an image to the outside, and the range of the second Bayer pattern may correspond to an area displayed by the display.

The processor may be independently mounted inside the camera module separately from the AP.

Advantageous Effects

An image sensor, a camera module, and an optical device including the same according to an embodiment may efficiently perform image processing without installing an expensive AP by performing a part of the image processing processed by the AP using a separate processor mounted on the image sensor, and thus, there is an effect that can relatively economically manufacture a camera module and an optical device including the same.

In addition, since the network configuration generates a high-resolution image in an optimized way, it can be implemented with a relatively small sized chip, and the present technology can be implemented by mounting the chip to which the present technology is applied in a camera device, so that the continuous zoom function can be used by applying the present technology to a camera device that does not have a zoom function or a camera device that only supports fixed zoom for a specific magnification.

In addition, since the processor performing preprocessing can perform some functions performed by an AP instead of using an algorithm that can perform image processing optimally through the deep learning process, the amount of data to be processed by the AP in real time can be reduced, and accordingly, there is an effect in that the power consumption of the AP can be lowered and the AP can be operated smoothly.

BEST MODE

The embodiments described in the present specification and the configurations illustrated in the drawings are preferred examples of the disclosed invention, and there may be various modifications that may replace the embodiments and drawings of the present specification at the time of filing of the present application.

In addition, terms used in the present specification are used to describe embodiments and are not intended to limit and/or limit the disclosed invention. Singular expressions include plural expressions unless the context clearly indicates otherwise.

In the present specification, terms such as "comprise", "include" or "have" are intended to designate the presence of features, numbers, steps, actions, components, parts, or a combination thereof described in the specification. Or the presence or addition of other features, numbers, steps, actions, components, parts, or combinations thereof, or any other feature, or a number, steps, operations, components, parts, or combinations thereof, and includes ordinal numbers such as "first" and "second" used herein. The terms described above may be used to describe various components, but the components are not limited by the terms.

Hereinafter, embodiments of the present invention will be described in detail with reference to the accompanying drawings so that those of ordinary skill in the art may easily implement the present invention. In addition, in the drawings, parts not related to the description are omitted in order to clearly describe the present invention.

Figure 1:
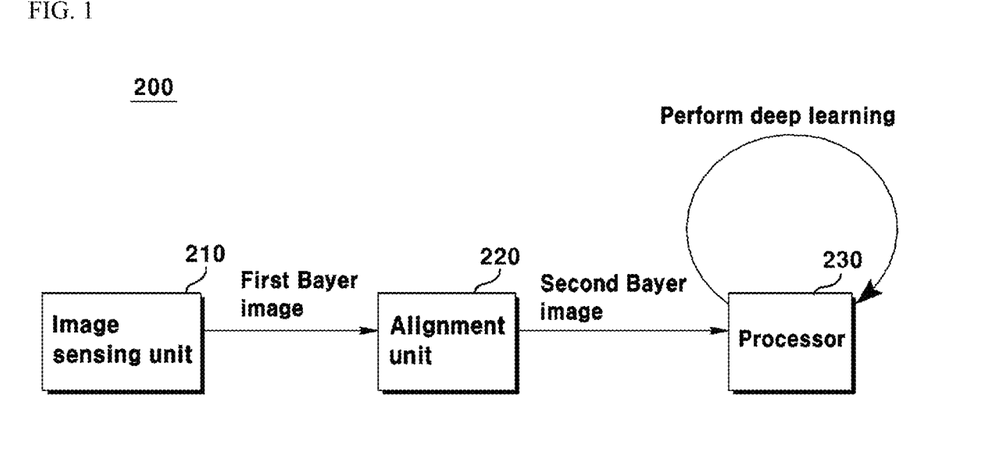
FIG. 1 is a block diagram illustrating a partial configuration of an image sensor according to an embodiment.

FIG. 1 is a block diagram illustrating a partial configuration of an image sensor 200 according to an embodiment.

Referring to FIG. 1, according to an embodiment, an image sensor 200 according to an embodiment may include: an image sensing unit 210 for acquiring an image of an external object; an alignment unit 220 for generating a new image by aligning or synthesizing the image acquired by the image sensing unit 210; and a processor 230 for performing deep learning based on the image received from the alignment unit 220.

The image sensing unit 210 may include a device that converts light entering through a lens 120 mounted on the camera module 100 into an electrical signal. Specifically, the sensing unit 210 may include various types of image sensors, such as a complementary metal oxide semiconductor (CMOS) or a charge coupled device (CCD).

Specifically, the image sensing unit 210 generates a first Bayer pattern having a first resolution based on information obtained through the lens 120 and transmits the generated first Bayer pattern to the alignment unit 220.

A typical camera device or camera apparatus can output image data through a process of receiving a Bayer pattern from an image sensor and applying a color (color interpolation process, color interpolation or demosaicing), and here, the Bayer pattern means raw data being outputted by the camera module 100 or the image sensing unit 210 that converts an optical signal included in the camera module 100 into an electrical signal.

To explain this in detail, the optical signal transmitted through the lens 120 included in the camera module 100 may be converted into an electrical signal through each pixel disposed in the image sensor capable of detecting colors of R, G, and B. For example, if the specification of the camera module 100 is 5 million pixels, it can be considered that an image sensor including 5 million pixels capable of detecting colors of R, G, and B is included.

And if the number of pixels of the image sensor is 5 million, in fact, it can be seen that each pixel does not detect all colors, but monochrome pixels that detect only the brightness of black and white are combined with any one of R, G, and B filters. That is, in the image sensor, R, G, and B color filters are disposed in a specific pattern on monochromatic pixel cells arranged as many as the number of pixels.

Accordingly, the R, G, and B color patterns are disposed intersected with one another according to the user's (i.e., human) visual characteristics, and this is called a Bayer pattern.

In general, the Bayer pattern has a smaller amount of data than image data. Therefore, there is an advantage in that even if the device is equipped with a camera module that does not have a high-end processor, it can transmit and receive Bayer pattern image information relatively faster than image data, and based on this, the Bayer pattern image can be converted into images with various resolutions.

For example, since a camera module is mounted on a vehicle, the camera module does not require many processors to process images even in an environment where the low voltage differential signaling (LVDS) having a full-duplex transmission speed of 100 Mbit/s is used, and thus it is not overloaded so that it may not endanger the driver or the safety of the driver using the vehicle.

In addition, since the size of data transmitted by the in-vehicle communication network can be reduced, there is an effect in that even if it is applied to an autonomous vehicle, it is possible to eliminate problems caused by the communication method, communication speed, and the like according to the operation of a plurality of cameras disposed in the vehicle.

Returning to FIG. 1 and explaining the image sensor 200, the alignment unit 220 may align or synthesize the images acquired by the image sensing unit 210 to generate a new image.

Specifically, the alignment unit 220 generates a second Bayer pattern by receiving the first Bayer pattern from the image sensing unit 210 and then decomposing or re-arranging all or part of the first Bayer pattern, and may transmit the generated second Bayer pattern to the processor 230. Accordingly, the second Bayer pattern may have the same size or smaller than the first Bayer pattern.

In general, in the case of image processing, performing image processing only on the region desired by the user excluding the region not desired by the user may reduce system overload and efficiently perform image processing.

Accordingly, the alignment unit 220 may generate second Bayer pattern by decomposing or rearranging at least a part of the first Bayer pattern so that the processor 230 can perform image processing only on an area where image processing is to be performed among the first Bayer patterns received from the image sensing unit 210, and transmit the generated second Bayer pattern to the processor 230.

And since the alignment unit 220 does not change the resolution of the Bayer pattern, in general, the resolution of the first Bayer pattern and the second Bayer pattern can be seen as having the same resolution.

After receiving a second Bayer pattern that is at least a part of a first Bayer pattern from the image sensing unit 210, the processor 230 may generate a third Bayer pattern having a higher resolution than the second Bayer pattern based on the received second Bayer pattern.

Specifically, the processor 230 may generate a third Bayer pattern having a third resolution value having a higher resolution than the first Bayer pattern from the second Bayer pattern having a first resolution received from the image sensing unit 210 by using an algorithm generated by deep learning training, and the value of the resolution of the third Bayer pattern can be freely set and changed by the user according to the purpose of the user.

In addition, the processor 230 performs super resolution (SR) or zooming on the received first Bayer pattern, and based on this, may generate a second Bayer pattern.

Accordingly, the image sensor 200 or the camera module 100 according to an embodiment may further include an input unit, although not illustrated in the drawing, for receiving information about the third Bayer pattern, through which the user may transmit information about a desired resolution to the image sensor 200 or the camera module 100.

For example, if the user wants to obtain a high resolution image, the third resolution may be set to a resolution having a large difference from the first resolution, and when a new image is desired to be acquired within a relatively short time, the third resolution value may be freely set to a resolution that does not have a large difference from that of the first resolution.

In FIG. 1, the alignment unit 220 and the processor 230 are illustrated as separate components, but are not limited thereto, and the processor 230 may simultaneously perform the role of the alignment unit 220.

In addition, the processor 230 may be implemented through a memory (not shown) in which at least one program instruction executed through the processor is stored.

Specifically, the memory may include a volatile memory such as SRAM or DRAM. However, it is not limited thereto, and in some cases, the memory may also include a non-volatile memory such as flash memory, read only memory (ROM), erasable programmable read only memory (EPROM), electronically erasable programmable read only memory (EEPROM), and the like.

Up to now, general components of the image sensor 200 according to an embodiment have been described. Hereinafter, a method and features of generating an algorithm applied to the processor 230 will be described.

The algorithm applied to the processor 230 of the image sensor 200 according to an embodiment is an algorithm for generating an image having a higher resolution than the resolution of the input image, and may mean an optimal algorithm that is generated by repeatedly performing deep learning training.

Deep learning, also referred to as deep structured learning, refers to a set of algorithms related to machine learning that attempts high-level abstraction (a task that summarizes core contents or functions in large amounts of data or complex data) through a combination of several nonlinear transformation methods.

Specifically, deep learning expresses any learning data in a form that a computer can understand (for example, in the case of an image, pixel information is expressed as a column vector, and the like), and is a learning technique for a lot of research (how to make a better representation technique and how to make a model to learn these) to apply these to learning, and may include learning techniques such as deep neural networks (DNN) and deep belief networks (DBN).

For example, deep learning may first recognize the surrounding environment and transmit the current environment state to the processor. The processor performs an action corresponding to it, and the environment informs the processor of a reward value according to the action again. And the processor takes the action that maximizes the reward value. Through this process, the learning process may be repeated.

As described above, the learning data used while performing deep learning may be a result obtained by converting a Bayer image with a low actual resolution into a Bayer image with a high resolution, or may be information obtained through simulation.

If the simulation process is performed, data can be acquired more quickly by adjusting it according to the environment of the simulation (the background of the image, the type of color, and the like). Hereinafter, a method of generating an algorithm applied to the processor 230 according to an embodiment will be described in detail with reference to FIGS. 3 and 4.

Figure 2:
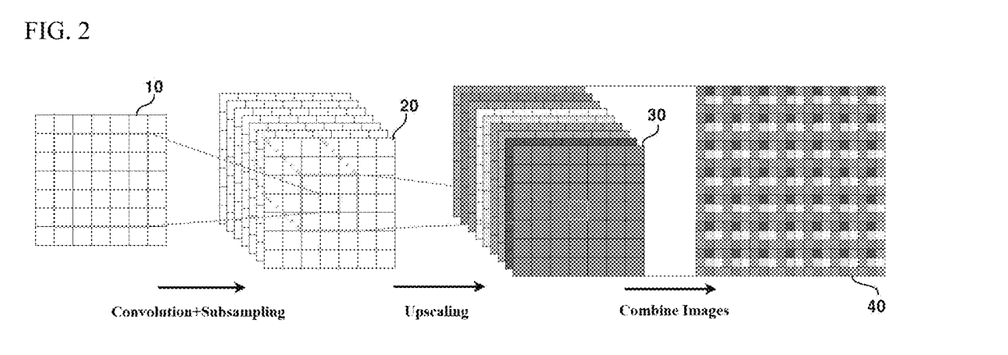
FIG. 2 is a diagram illustrating a process of performing deep learning training according to an embodiment.
Figure 3:
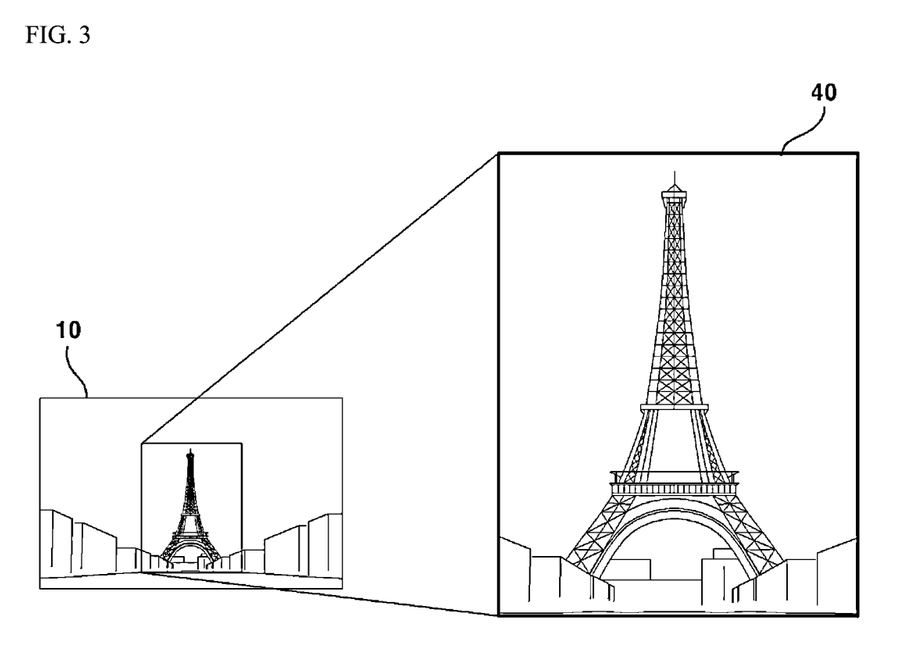
FIG. 3 is a diagram illustrating an image having a third Bayer pattern that has passed through a processor according to an embodiment.

FIG. 2 is a diagram illustrating an image having a third Bayer pattern that has passed through a processor according to an embodiment, and FIG. 3 is a block diagram illustrating a partial configuration of an optical device according to another embodiment.

The deep learning of FIG. 2 is deep learning to which a deep neural network (DNN) algorithm is applied, and is a diagram illustrating a process of generating an image having a new resolution as the DNN algorithm is applied.

Deep neural networks (DNNs) can be specified as a deep neural network in which multiple hidden layers exist between an input layer and an output layer, a convolutional neural network that forms a pattern of connections between neurons, similar to the structure of the visual cortex of animals, and a recurrent neural network that builds up a neural network at every moment over time.

Specifically, DNN classifies neural networks by repeating convolution and sub-sampling to reduce the amount of data and distort. In other words, DNN outputs classification results through feature extraction and classification, and is mainly used for image analysis, and convolution means image filtering.

If describing the process being performed by the processor 230 to which the DNN algorithm is applied with reference to FIG. 2, the processor 230 performs convolution and sub-sampling on a region whose magnification is desired to be increased based on a first Bayer pattern 10 having a first resolution.

Increasing the magnification means enlarging only a specific part among the image acquired by the image sensing unit 210. Accordingly, since the portion not selected by the user is a portion that the user is not interested in, there is no need to perform a process of increasing the resolution, so that only the portion selected by the user may be subjected to the convolution and subsampling process.

Subsampling refers to a process of reducing the size of an image. As an example, sub-sampling may use a Max-pool method and the like. Max-pull is a technique that selects the maximum value in a given region, similar to how neurons respond to the largest signal. Subsampling has advantages of reducing noise and increasing learning speed.

When convolution and subsampling are performed, a plurality of images 20 may be outputted as illustrated in FIG. 2. Thereafter, a plurality of images having different features may be outputted using an up-scale method based on the outputted images. The up-scaling method means scaling an image by r*r times using $r^2$ different filters.

When a plurality of images are being outputted as illustrated in FIG. 2 according to the up-scale 30, the processor 230 may recombine the images based on these images and finally output a second Bayer image 40 having a second resolution.

Accordingly, when a user selects a specific region from the image 10 having a first resolution as illustrated in FIG. 3, the processor 230 can perform the deep learning described above only for that region, and as a result of this, as illustrated in FIG. 3, a Bayer image 40 having a second resolution may be generated.

In general, in order to implement a processor capable of deep learning with a small chip, the number of deep learning processes and memory gates should be minimized, and here, the factors that have the greatest influence on the number of gates are the algorithm complexity and the amount of data processed per clock, and the amount of data processed by the processor depends on the input resolution.

Accordingly, since the processor 230 according to an embodiment creates a high-magnification image in a way that upscaling is performed after reducing the input resolution to reduce the number of gates, there is an advantage in that images can be generated faster.

For example, if an image with an input resolution of 8 MP (mega pixel) needs to be zoomed twice, it is zoomed twice by upscaling two times each in the horizontal and vertical directions based on the ¼ area (2 MP). And after ¼ downscaling of ¼ area (2 MP) and using an image with a resolution of 0.5 MP as input data for deep learning, and based on the generated image, if it is zoomed 4 times (4×) in a way that the width and length are upscaled by 4 times respectively, a zoom image of the same area that is zoomed twice can be generated.

Therefore, in the processor 230 according to an embodiment, in order to prevent performance degradation due to input resolution loss, deep learning generates an image by learning as much as a magnification corresponding to the resolution loss, so there is an advantage of minimizing performance degradation.

In addition, deep learning-based algorithms for realizing high resolution images generally use a frame buffer, which may be difficult to operate in real time in general PCs and servers due to its characteristics, however, since the processor 230 according to an embodiment applies an algorithm that has already been generated through deep learning, it can be easily applied to a low-spec camera device and various devices including the same. In addition, in applying this algorithm specifically, high resolution is realized by using only a few line buffers, so there is also an effect that a processor can be implemented with a relatively small chip.

In addition, performing deep learning in the present specification may mean a process of generating an algorithm through inference or iterative learning in order to generate an optimal algorithm as described previously with reference to FIG. 2, but at the same time, executing the algorithm generated by such process can also be seen as performing deep learning.

Figure 4:
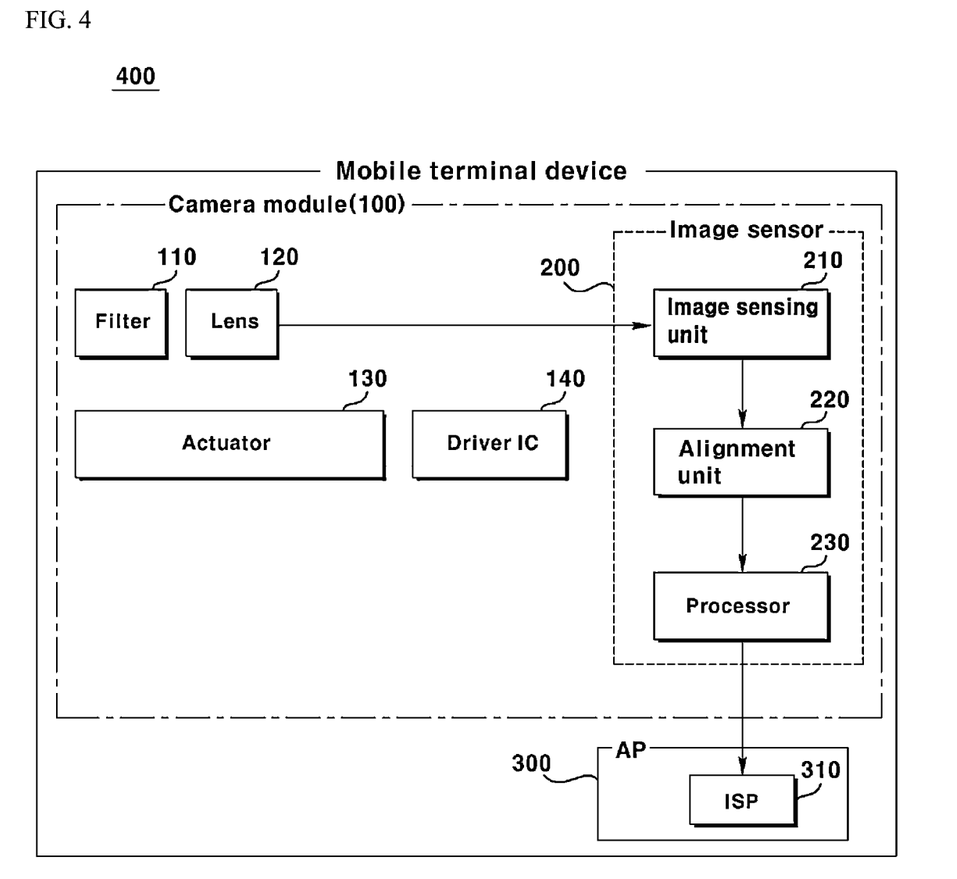
FIG. 4 is a block diagram illustrating a partial configuration of an optical device according to another embodiment.

FIG. 4 is a block diagram illustrating a partial configuration of an optical device according to another embodiment.

Referring to FIG. 4, an optical device 400 according to an embodiment may include an image sensor 200, a camera module 100 including an image sensor; and an AP 300 including an ISP 310.

Specifically, the camera module 100 may include a filter 110, a lens 120, an actuator 130, a driver IC 140, and an image sensor 200.

Since the image sensor 200 and the image sensing unit 210 included in the image sensor 200, the alignment unit 220, and the processor 230 are components that play the same role as those described in FIG. 1, a description thereof will be omitted.

The filter 110 of the camera module 100 serves to selectively block light entering from the outside, and may be generally located at an upper portion of the lens 120.

The lens 120 is a device that finely grinds the surface of a transparent material such as glass into a spherical surface to collect or emit light from the object to form an optical image, and a general lens 120 used in the camera module 100 may be provided with a plurality of Lenses having different characteristics.

The actuator 130 may adjust the focus by adjusting the position of the lens 120 or the barrel including the lens 120. For example, the actuator 130 may be a voice coil motor (VCM) type. And the lens 120 may include a variable focus lens.

When the actuator 130 includes a variable focus lens, the driver IC 140 may drive the variable focus lens.

The driver IC 140 may mean a semiconductor (IC) that provides driving signals and data as electrical signals to the panel so that characters or video images are displayed on the screen, and as will be described later, the driver IC 140 may be disposed in various positions of the optical device 400. In addition, the driver IC 140 may drive the actuator 130.

The application processor (AP) 300 is a mobile memory chip and may mean a core semiconductor in charge of operations of various applications and graphic processing in the optical device 400.

The AP 300 may be implemented in the form of a system on chip (SoC) that includes both the functions of a computer's central processing unit (CPU) and the functions of a chipset that controls the connection of memory, hard disk, graphic card, and other equipment.

The image signal processing unit (ISP) 310 may receive a second Bayer image generated by the processor 230 using a mobile industry processor interface (MIPI) communication and perform the process of an image signal processing.

The image signal processing unit 310 may include a plurality of sub-processes while processing the image signal. For example, Gamma correction may be performed on the received image, or at least one or more among color correction, auto exposure correction, and auto white balance may be performed.

In addition, after receiving the information again from the AP 300 which is information outputted by the image sensing unit 210 and transmitted to the AP 300, the processor 230 according to an embodiment may generate a third Bayer pattern having a higher resolution than the second Bayer pattern based on the received image information.

Specifically, the processor 230 receives image information from the AP 300, and then sets a range to be set to the second Bayer pattern from the first Bayer pattern based on the image information that has been received, and based on the set range, the third Bayer pattern may be generated and the generated third Bayer pattern may be transmitted to the AP 300.

And the image information may include zoom information about the first Bayer pattern, or may include information on an area displayed by a display (not shown) that displays an image to the outside. That is, the zoom information means an area that a user wants to view with a higher resolution, and the area displayed by the display means some images displayed on the display among photographed images.

Accordingly, the processor 230 according to an embodiment does not perform image processing on a portion that does not need to perform image processing based on such information, but selectively performs image processing only on the area where image processing is to be performed, so that the efficiency can be increased.

For example, in the case when the area of interest corresponds to ¼ of the image due to zoom in an image sensor with 8 MP resolution, the operation of the processor is greatly affected when inputting an image having a size of 8 MP is inputted into 8 MP, compare to inputting only 2 MP corresponding to the area of interest (¼ of the entire image) due to zooming. That is, it is because image processing of a non-interested area consumes a lot of time and may overload the operation of the processor.

However, the processor 230 according to an embodiment, based on the information received from the AP 300, does not perform image processing on a portion that does not need to be processed, but selectively performs image processing only on the area where image processing must be performed, so that there is an effect that the image processing can be performed more effectively.

In addition, since the image sensor 200 according to an embodiment performs SR function through self-integration inside the sensor, it is possible to increase the use efficiency of the memory, and there is an effect of avoiding a separate redundant memory stack structure for securing real-time performance through the use of 3 stack DRAM structure of the image sensor 200.

In general, in the case of a technology that generates more pixel information to realize a high-resolution image, there exists single-frame Super Resolution (SR) or multi-frame Super Resolution (SR) technology, or the like, but in the case of these technologies, there is no artifact problem, but it is an algorithm that is difficult to apply to devices to which small camera modules such as mobile, vehicle, IoT, and the like can be applied, and in addition, a separate image processor is mounted in order to implement such a technology.

However, since the software for performing such a synthesis algorithm generally has a large amount of data to be processed, there was a problem that it was difficult to process in real time even in an application processor (AP), and even if the AP could perform these functions, such an AP was expensive, and there was a problem in that the manufacturing cost is increased.

However, the camera module 100 or the optical device 400 according to an embodiment, as illustrated in FIG. 4, since the image sensor 200 includes a processor 230 that can perform a part of image processing processed by the AP 300, efficient image processing is possible without installing an expensive AP, so that there is an effect of being able to manufacture a camera module and an optical device relatively economically.

In addition, since the image sensor 200 performs pre-processing on the image based on information on the Bayer pattern before image processing in the AP 300, there is an effect of reducing the amount of data to be processed by the AP 300. Accordingly, there is an effect of lowering power consumption of the AP 300 and operating the AP 300 more smoothly by such a structure and sequence.

That is, in the case of the prior art, in order to establish a communication connection between the image sensor, the processor, and the AP, the "image sensor output (MIPI tx)-chip input (MIPI rx)-chip output (MIPI tx)-AP input (MIPI rx)" structure was required, but since the optical device 400 according to an embodiment has a processor 230 that performs a pre-processing function inside the image sensor 200 and the information generated by the processor 230 can be outputted through the existing image sensor output 250 (MIPI tx), there is an effect of making the design relatively simple.

Accordingly, in the optical device 400 according to an exemplary embodiment, the part "chip input (MIPI rx)-chip output (MIPI tx)" can be deleted from the structure "image sensor output (MIPI tx)-chip input (MIPI rx)-chip output (MIPI tx)—AP input (MIPI rx)" of the prior art. In addition, the cost of MIPI IP can be reduced due to the integration with the image sensor 200, so that the camera module and optical device can be economically manufactured, and the freedom of design can also be increased.

In addition, since various data information shared inside the image sensor 200 are shared together in the chip, the control signal of the AP 300 can also be unified and communicated, and memory can also be saved by using the EEPROM or Flash memory already in the image sensor 200 together.

In addition, since the image sensor 200 also includes simple ISP functions, if these functions are used for image data, a more diverse deep learning image database can be created, so that there is an effect in that the final performance can be enhanced.

Figure 6:
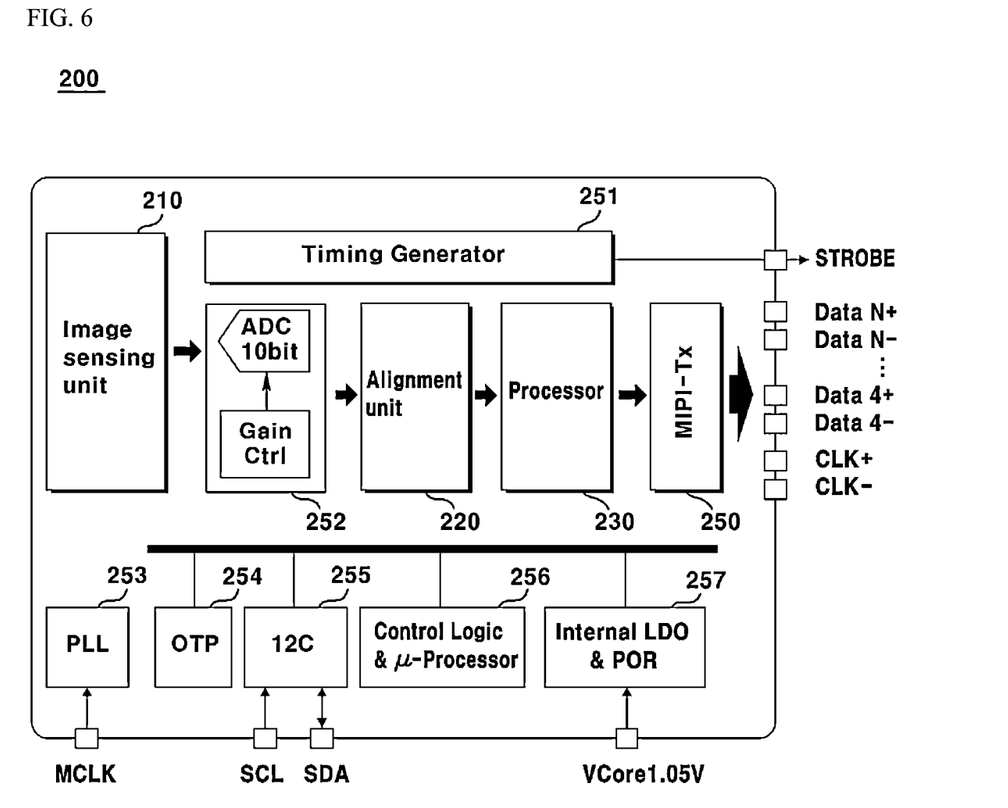
FIG. 6 is a block diagram illustrating a partial configuration of an image sensor according to another embodiment.

FIG. 6 is a block diagram illustrating a partial configuration of an image sensor 200 according to another embodiment.

Figure 5:
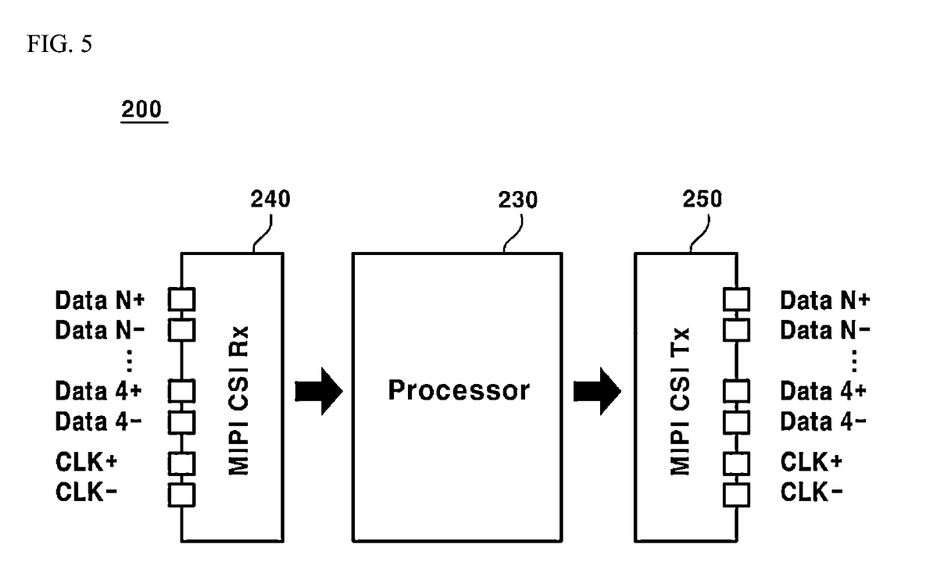
FIG. 5 is a block diagram illustrating a partial configuration of an image sensor according to another embodiment.

FIG. 6 corresponds to a more detailed view of the image sensor 200 of FIG. 1 of the image sensor 200, and a description overlapping with FIG. 1 will be omitted. In general, in order to transmit high-capacity image raw data input from the image sensing unit 210 and processed through an internal block to the AP 300, a high-speed MIPI interface must be used. Accordingly, the phase locked loop (PLL) 253 in FIG. 5 is a component that performs such a function, and may perform the role of frequency division and multiplication in order to achieve a speed of several Gbps. The OTP 254 refers to a memory space for storing the image sensing unit 210 and a specific parameter of the SR algorithm.

The I2C 255 is an interface used to output an instruction according to a user's manipulation of the camera module 100 from the AP 300 and generally has a bus structure connected by two lines SCL and SDA.

In the Internal LDO (Low Drop Voltage Out) & POR 257, the Internal LDO can serve to supply power to the image sensing unit 210, and in the case of POR, a reset function for smooth operation in the power saving mode may be performed simultaneously with the operation instruction of the AP 300.

Figure 7:
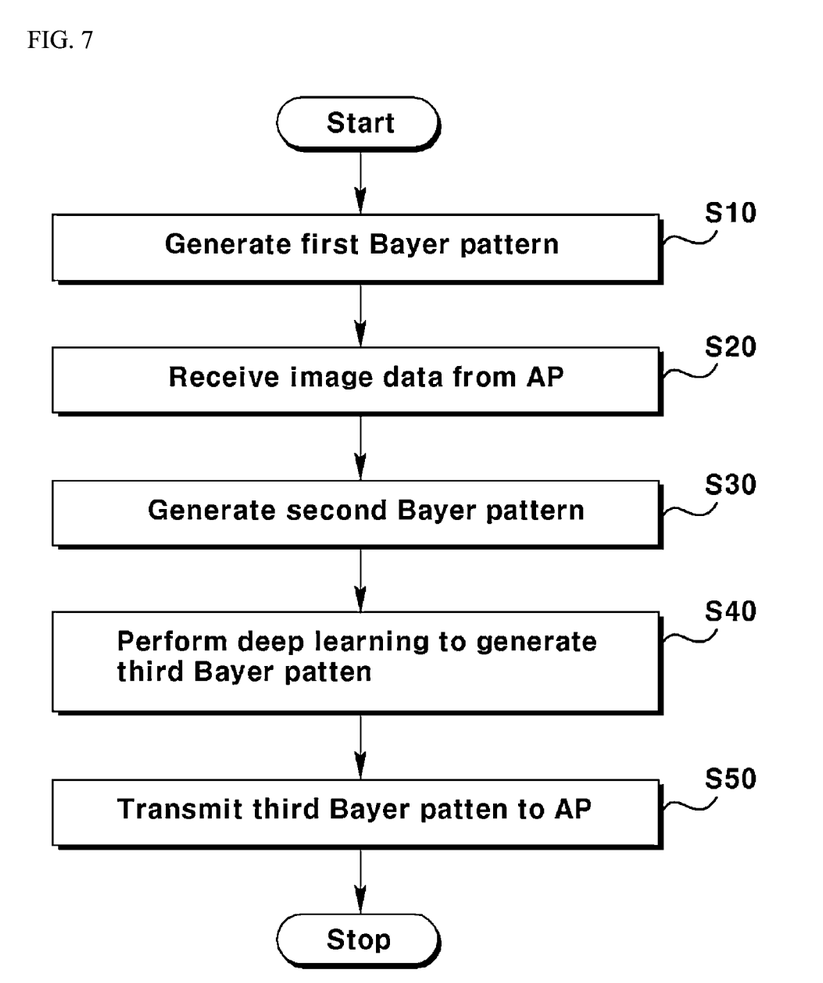
FIG. 7 is a flowchart illustrating a method of controlling an optical device according to an embodiment.

FIG. 7 is a flowchart illustrating a method of controlling an optical device 400 according to an embodiment.

Referring to FIG. 7, the optical device 400 may generate a first Bayer pattern based on information about an object received from the outside (S10).

Thereafter, after receiving the information on the region to be image processed from the AP, at least a partial region to be image processed among the first Bayer patterns is created as the second Bayer pattern (S20, S30).

Thereafter, after performing deep learning to generate a third Bayer pattern having a higher resolution than that of the second Bayer pattern, the generated third Bayer pattern may be transmitted to the AP.

Up to now, the image sensor 200, the camera module 100, and the optical device 400 including the camera module have been studied through the drawings.

Since the software for performing such a synthesis algorithm generally has a large amount of data to be processed, there was a problem that it was difficult to process in real time even in an application processor (AP), and even if the AP could perform these functions, such an AP was expensive, and there was a problem in that the manufacturing cost is increased.

However, the camera module 100 or the optical device 400 according to an embodiment, since the image sensor 200 includes a processor 230 that can perform a part of image processing processed by the AP 300, efficient image processing is possible without installing an expensive AP, so that there is an effect of being able to manufacture a camera module and an optical device relatively economically.

That is, since the image sensor 200 performs pre-processing on the image based on information on the Bayer pattern before image processing in the AP 300, there is an effect of reducing the amount of data to be processed by the AP 300. Accordingly, there is an effect of lowering power consumption of the AP 300 and operating the AP 300 more smoothly by such a structure and sequence.

In addition, since the camera module 100 according to an embodiment generates a high-resolution image in a way that optimizes the network configuration, it can be implemented with a relatively small sized chip, and the present technology can be implemented by mounting the chip to which the present technology is applied in a camera device, so that the continuous zoom function can be used by applying the present technology to a camera device that does not have a zoom function or a camera device that only supports fixed zoom for a specific magnification.

Up to now, although the embodiments so far have been described with reference to the limited embodiments and drawings, various modifications and variations are possible from the above description by those skilled in the art. For example, appropriate results can be achieved if the described techniques are performed in a different order from the described method, and/or components of the described systems, structures, devices, circuits, and the like are combined or combined in a manner different from the described method, or even if substituted or substituted by other components or equivalents. Therefore, other embodiments and equivalents to the claims also fall within the scope of the claims to be described later.

The invention claimed is:

1. An image sensor device comprising:
   an image sensing unit for receiving light and generating a first Bayer pattern having a first resolution; and
   a processor for generating a second Bayer pattern by performing super resolution (SR) on the first Bayer pattern and generating a third Bayer pattern having a higher resolution than the second Bayer pattern based on the second Bayer pattern,
   wherein the processor outputs the third Bayer pattern by performing image processing on the second Bayer pattern based on a deep neural network (DNN) algorithm obtained by performing deep learning,
   wherein the image sensing unit outputs image data to an application processor (AP) which is located outside from the image sensor device, and
   wherein the processor receives the image data from the AP and generates the second Bayer pattern using the image data received from the AP.

2. The image sensor device according to claim 1, wherein the processor receives the first Bayer pattern from the image sensing unit and generates the second Bayer pattern by decomposing or re-arranging at least a portion of the first Bayer pattern.

3. The image sensor device according to claim 2, wherein the processor decomposes or re-arranges the at least the portion of the first Bayer pattern in a range that the processor sets.

4. The image sensor device according to claim 2, wherein the processor generates the third Bayer pattern based on the second Bayer pattern.

5. A camera module comprising:
   an image sensing unit for receiving a light to generate a first Bayer pattern having a first resolution; and
   a processor for generating a second Bayer pattern by performing super resolution (SR) on the first Bayer pattern and generating a third Bayer pattern having a higher resolution than the second Bayer pattern based on the second Bayer pattern,
   wherein the processor outputs the third Bayer pattern by performing image processing on the second Bayer pattern based on a deep neural network (DNN) algorithm obtained by performing deep learning,
   wherein the image sensing unit outputs image data to an application processor (AP) which is located outside from an image sensor device, wherein the image sensor device includes the image sensing unit and the processor, and
   wherein the processor receives the image data from the AP and generates the second Bayer pattern using the image data received from the AP.

6. The camera module according to claim 5, wherein the processor receives the first Bayer pattern from the image sensing unit, generates the second Bayer pattern by decomposing or re-arranging at least a portion of the first Bayer pattern, and generates the third Bayer pattern based on the second Bayer pattern.

7. The camera module according to claim 6, wherein the processor decomposes or re-arranges the at least the portion of the first Bayer pattern in a range that the processor sets.

* * * * *